United States Patent [19]

Pottorff

[11] Patent Number: 5,585,120
[45] Date of Patent: Dec. 17, 1996

[54] EXTRIUDED METAL COLLAPSING BOARDS WITH REPLACEABLE WEAR PLATES

[75] Inventor: Earl T. Pottorff, Savannah, N.Y.

[73] Assignee: Pearl Technologies, Inc., Savannah, N.Y.

[21] Appl. No.: 350,264

[22] Filed: Dec. 5, 1994

[51] Int. Cl.⁶ .................................................. B29C 33/48
[52] U.S. Cl. ...................... 425/72.1; 425/326.1; 425/327; 425/387.1
[58] Field of Search .............................. 425/72.1, 326.1, 425/327, 387.1

[56] References Cited

U.S. PATENT DOCUMENTS

| | | | |
|---|---|---|---|
| 3,002,430 | 10/1961 | Voigt et al. | 425/326.1 |
| 3,223,762 | 12/1965 | Fry | 425/326.1 |
| 3,600,488 | 8/1971 | Yazawa | 425/72.1 |
| 3,752,612 | 8/1973 | Van Duuren | 425/327 |
| 3,784,347 | 1/1974 | Robinson | 425/387.1 |
| 4,068,999 | 1/1978 | Dawson | 425/326.1 |
| 4,388,061 | 6/1983 | Bebok | 425/326.1 |
| 4,453,907 | 6/1984 | Taguchi | 425/326.1 |
| 4,533,309 | 8/1985 | Planeta | 425/326.1 |
| 4,615,666 | 10/1986 | Steinberg | 425/72.1 |
| 4,728,277 | 3/1988 | Planeta | 425/326.1 |
| 4,943,226 | 7/1990 | Pottorff | 425/326.1 |
| 4,943,266 | 7/1990 | Potorff | 425/326.1 |

FOREIGN PATENT DOCUMENTS

| | | | |
|---|---|---|---|
| 1504039 | 9/1969 | Germany . | |
| 3543198 | 6/1988 | Germany | 425/326.1 |

*Primary Examiner*—Thomas R. Weber
*Attorney, Agent, or Firm*—Trapani & Molldrem

[57] ABSTRACT

A collapsing board employed in the manufacture of polyethylene film is formed as an extruded aluminum member with a back plate that fastens onto the collapsing frame and an arcuate front face that urges the moving polyethylene extrusion to a collapsed condition. A low friction material is applied onto the arcuate front face. In one preferred embodiment, the low-friction material is in the form of an extruded plastic replaceable wear cover. In another embodiment, a ceramic coating is deposited onto the arcuate front face of the metal extrusion. The plastic wear cover can have a co-extruded two-layer front web, with a lubricant filled front layer and a backing layer of a distinct color that is revealed when the front layer becomes worn from use.

16 Claims, 4 Drawing Sheets

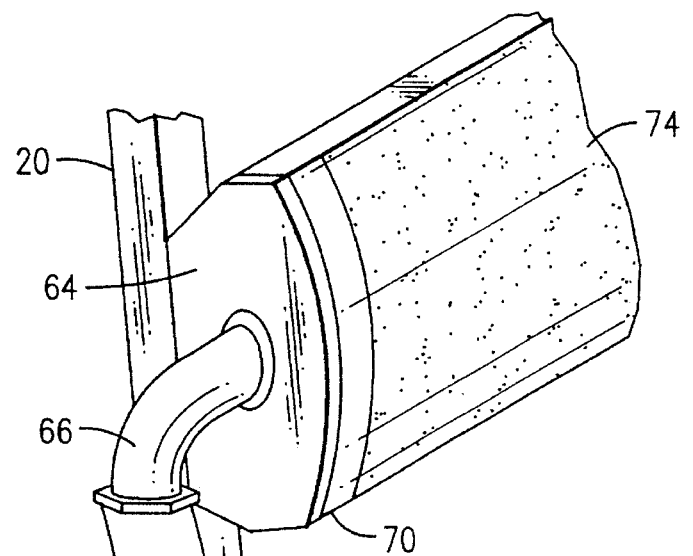
FIG.7
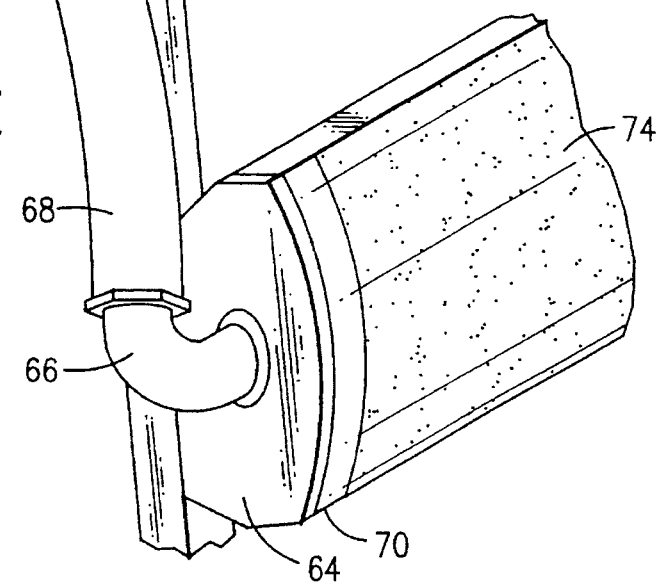
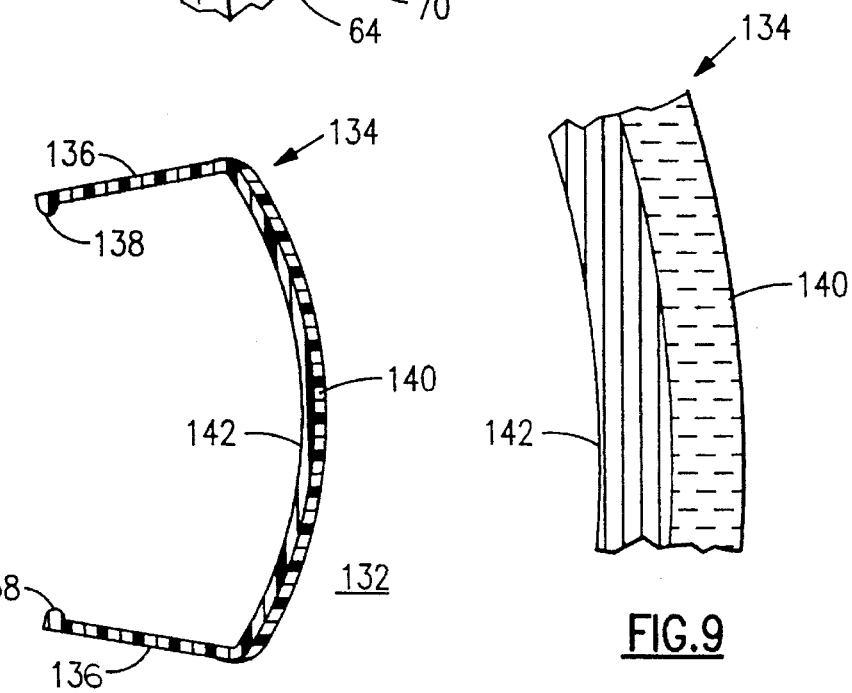
FIG.8
FIG.9

5,585,120

EXTRIUDED METAL COLLAPSING BOARDS WITH REPLACEABLE WEAR PLATES

BACKGROUND OF THE INVENTION

This invention relates to the manufacture of flexible plastic film, such as polyethylene film, for use as bags, sheets, and the like.

Polyethylene film is typically created using a tube extension process, in which a tube of the so plastic is extruded though an annular die, and is then inflated and expanded until the tube wall is a desired thickness. The film is typically made anywhere in the range of about 0.3 mils to several mils, depending upon the end use. After the tube of material is extruded, it is drawn vertically upward, typically a distance of forty yet or more. The air within the tube expands the tube outward until the plastic sets. On its journey upwards, the extended tube has to be flattened so that it may pass between rollers. The flattening is accomplished by a collapsing assembly, in which two facing arrangements of collapsing boards urge the tubular extrusion to a flattened state by the time it reaches the rollers.

Typically, this arrangement consists of a pair of facing collapsing frames, each of which has a number of collapsing boards which are horizontal and arranged in parallel, one above the other on the frame. There are typically sixty to ninety boards on a side, the boards being from twelve inches to fourteen feet in length. These collapsing boards are, by convention, formed of high quality hardwood, usually a close grained maple, which is extremely expensive. The boards have a curved or arcuate face against which the plastic film passes. The polyethylene film is quite abrasive to the wood. Even very high quality hardwood as typically used will tend to wear out somewhat unevenly. These boards thus have to be replaced periodically and this is an expensive and time consuming procedure. To replace the collapsing boards on the frame, the boards and any associated hardware have to be unscrewed, so that the entire board can be replaced. The boards are typically four to twenty feet in length, and can be quite heavy and unwieldy for a workman to manage. There is considerable down time involved with collapsing board replacement, as it now takes about three full days to replace all the collapsing boards.

A solution to the problem just described has been disclosed in my earlier U.S. Pat. No. 4,943,226, which was granted on Jul. 24, 1990. That patent describes replaceable plastic covers or wear plates to be installed on the collapsing boards or slats. These covers are extruded of a rigid or semi-rigid plastic resin material impregnated with graphite or another lubricating agent. In this system, the collapsing board covers have a front face or web that is contoured to match the front thee of the collapsing boards, and upper and lower flanges that fit behind the board to retain the cover on it. The covers can snap fit onto the board or can slide on. The covers absorb the wear and abrasion from the polyethylene film, and when worn can be quickly and economically replaced.

However, even in this case the initial requirement for close-grained maple is a great capital expense. Also, for longer slats, it is often necessary to join maple lengths end to end. In addition, the heat from friction with the polyethylene film is difficult to dissipate in the maple slats. This can affect and limit the performance of the film extrusion process.

OBJECTS AND SUMMARY OF THE INVENTION

Accordingly, it is an object of this invention to provide a technique of covering the collapsing boards so as to avoid the drawbacks of the present system as described hereinabove.

It is a more specific object of this invention to proved a collapsing tower system that avoids the capital costs, installation costs and replacement costs of boards.

It is a further object to provide improved collapsing boards which are relatively inexpensive and light-weight relative to hardwood collapsing boards, and which have an improved heat management capability.

According to one aspect of the invention, the collapsing boards are formed of an extrusion of aluminum or other light-weight metal, i.e., a backer board, in combination with low-friction wear material disposed on its front surface. In one embodiment, the extruded backer board can be an open channel of aluminum on which a plastic collapsing board cover is installed. Alternatively the extrusion can be a tubular member of an appropriate profile, with the removable collapsing board cover providing the low-friction surface. In another embodiment, a ceramic coating on the tubular metal extrusion can provide the low-friction surface, such that the collapsing board is one piece.

A flow of air or water can be provided in the interior of the metal extrusions for controlled cooling.

In the case of the replaceable covers or wear plates, the front face can be made of two layers, with a backing layer of a distinctive color which will be revealed when the face layer is worn down and needs to be replaced.

The above and many other objects, features and advantages of this invention will be more fully understood from the ensuing description of a preferred embodiment, which should be considered in connection with the accompanying Drawing.

BRIEF DESCRIPTION OF THE DRAWING

FIG. 7 is another perspective view of the embodiment of FIG. 6 showing an adaptation for water cooling.

FIG. 8 and 9 are cross sections of an improved wear cover according to an embodiment of this invention.

DETAILED DESCRIPTION OF A PREFERRED EMBODIMENT

Figure 1:
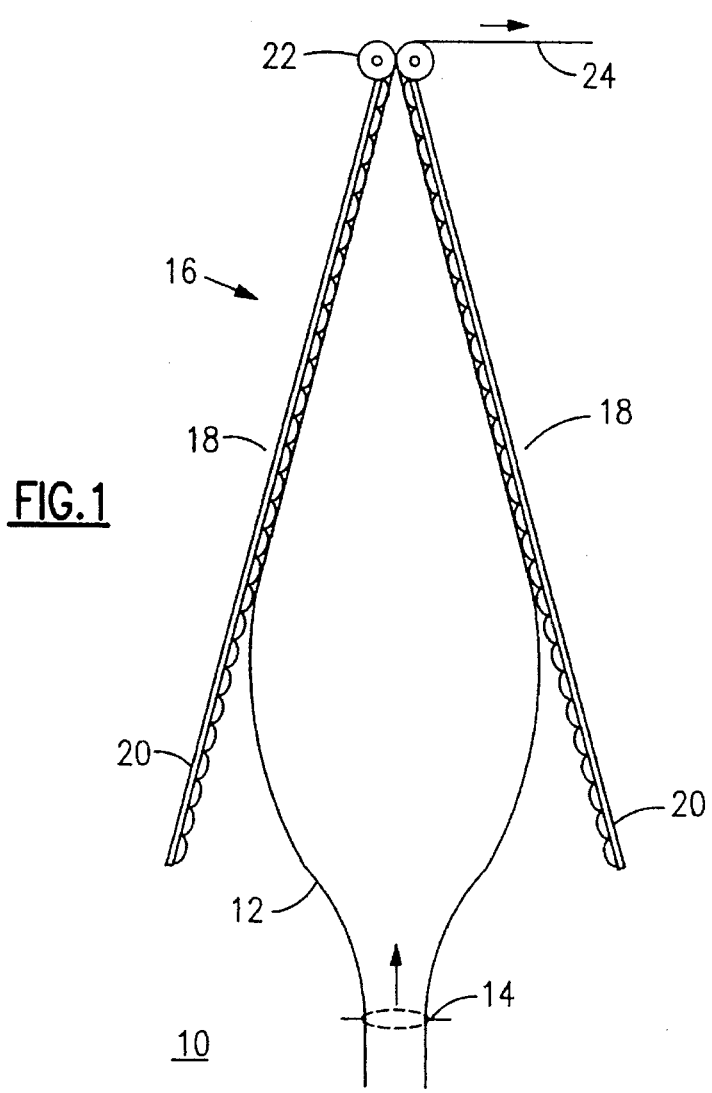
FIG. 1 is a schematic elevational view of a portion of a plastic film extrusion process, illustrating the role of collapsing boards.

With reference to the Drawing, and initially to FIG. 1, a polyethylene film extrusion arrangement 10 involves forming a tubular extrusion 12 of polyethylene film through an extrusion die 14, shown schematically here as a ring or annular die. Not shown is an air jet for injecting make-up air into the interior of the extrusion, as necessary. The film in the extrusion 12 is initially somewhat fluid, and inflates to a larger diameter with a correspondingly thinner wall, cooling and solidifying when a predetermined thickness is reached. The process is controlled and adjusted so that the film has a uniform thickness, and this basic process is well known in the art.

As the tubular extrusion 12 is drawn upwards, it must be flattened, and so a collapsing frame 16 is provided to urge opposite sides of the tubular extrusion 12 towards one another. Here the collapsing frame consists of a pair of opposed arrays of horizontal collapsing boards 18. These boards 18, which are shown end-on, are typically elongated hardwood members with a generally D-shaped cross section. Close-, straight-grained hardwood, such as maple, is required to withstand the abrasiveness of the polyethylene film. This type of hardwood is extremely expensive. As robust as the hardwood is, it will still wear out as the film 12 is drawn past it, and these boards have to be replaced. The boards 18 are arranged in parallel, one above the other, and are supported generally on vertical support members 20. The two opposed arrays lean into one another to collapse the extrusion 12 at the top, where the extrusion passes between a pair of rollers 22. There the film exits as a double thickness 24 of film, and proceeds to cutting, printing, rolling, or other equipment (not shown).

Figure 2:
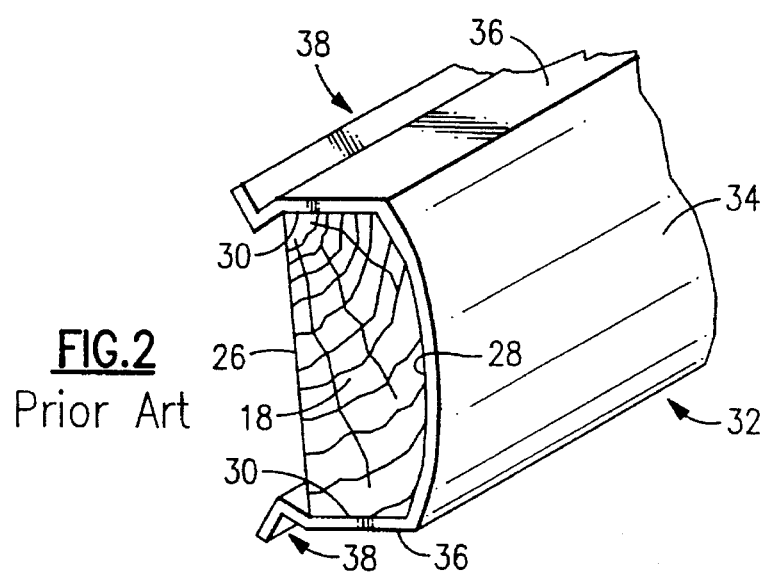
FIG. 2 is a partial perspective view showing a collapsing board cover according to the prior

The configuration of the collapsing board 18 of my earlier U.S. Pat. No. 4,943,226 is shown in more detail in FIG. 2. The boards 18 typically each have a flat back surface 26 which is fastened by screws or other hardware into the support members 20, and a convex, generally cylindrical arcuate front surface 28. These collapsing boards 18 also have generally horizontal top and bottom edges 30.

In order to absorb the frictional rubbing of the tubular extrusion 12, the boards 18 are provided with replaceable collapsing board covers 32, a portion of one being shown here. In a preferred embodiment, the cover 32 is an extruded channel member formed of a graphite impregnated, flexible, semi-rigid synthetic resin. Torlon, which is a graphite-impregnated nylon resin, is suitable for this. This material has a high slip factor, yet is rigid enough to retain its own shape. Another extrudable material, such as polyvinyl chloride, could also be used. The channel has an arcuate face or web 34 which fits the arcuate face 28 of the board 18, and top and bottom flanges 36 which extend from top and bottom edges of the face 34 over the collapsing board edges 30 to the rear surface 26. In this embodiment, there are V-shaped lip members 38 at the rear or free edges of the flanges 36. These snap over the board edges 30 at the rear surface 26 to retain the cover 32 on the board 18.

The covers 32 simply snap into place over the existing boards 18. The top and bottom flanges 36 can be cut out, as necessary, to accommodate the vertical support members 20 and any mounting hardware. Thus, it is unnecessary to remove any of the collapsing boards 18 from the support members 20.

Figure 3:
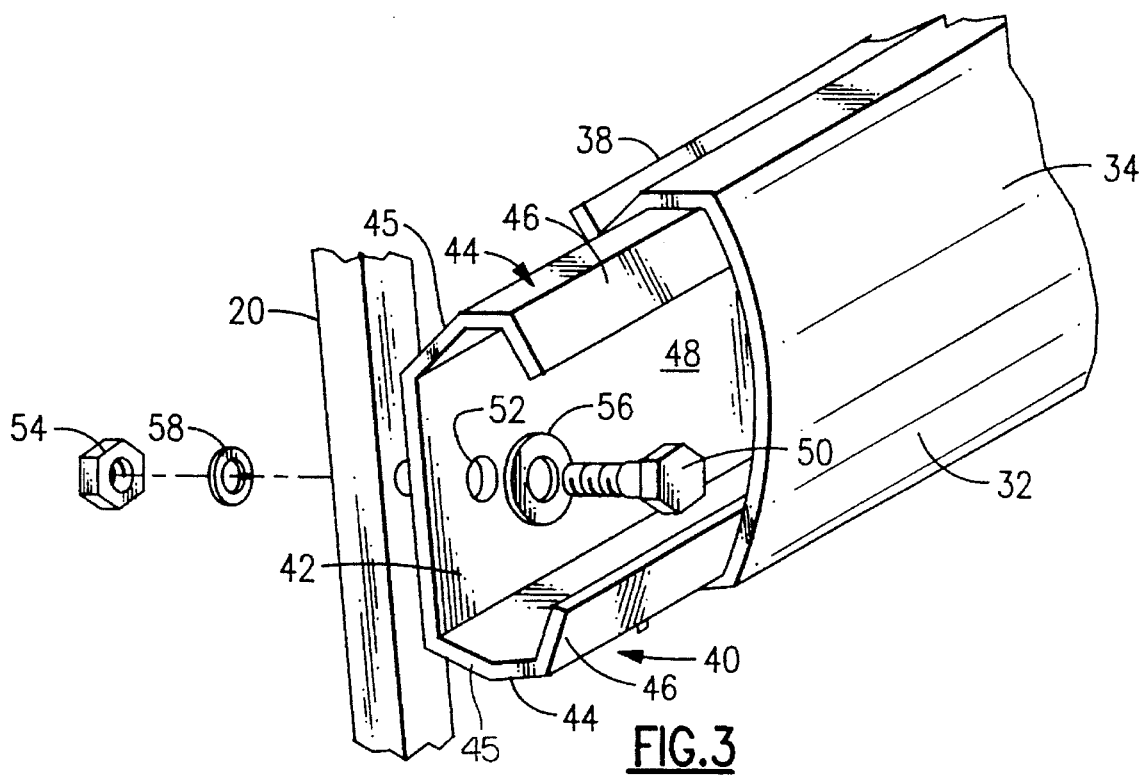
FIG. 3 is partial assembly view of an extruded metal backer board and plastic wear cover of a first embodiment of this invention.

An improved collapsing board according to this invention is shown in FIG. 3. Here the collapsing board employs a backer board 40 which is an aluminum extrusion of generally C-shaped profile, and which has a back plate 42 that fastens onto vertical frame members 20. Upper and lower flanges 44 reach forward from the back plate 42, and support a respective pair of inwardly directed front lips 46. The two lips 46 form a front wall with a gap 48 defined between them. This from wall is spaced a predetermined distance from the back plate 42. A bolt 50 passes through a bolt hole 52 in the back plate 42, and then through the vertical frame member 20, and is held in place by a threaded nut 54. A washer 56 and a lock washer 58 can be used with the bolt 50 to hold the collapsing board in place.

As shown here, a plastic wear plate or cover 32 fits over the open-channel backer board 40, with the V-shaped lip members 38 lodging against sloping walls 45 of the upper and lower flanges 44. The front face or web 34 of the cover spans the front surface of the board including the lips 46 and the gap 48. The cover 32 serves as a low-friction front surface of the collapsing board and guides the plastic film that moves across it. The extruded plastic covers 32 are of extremely low cost compared with hard maple, and can be easily replaced when worn.

As shown here, the gap 48, being disposed centrally on the front surface of the extrusion, permits access to the bolt 50 to facilitate installation.

The extruded backer board 40 here has an open interior, and a flow of cooling air can be forced through it, using a suitable blower (not shown), to help dissipate heat of friction between the cover 38 and the plastic film 12.

Figure 4:
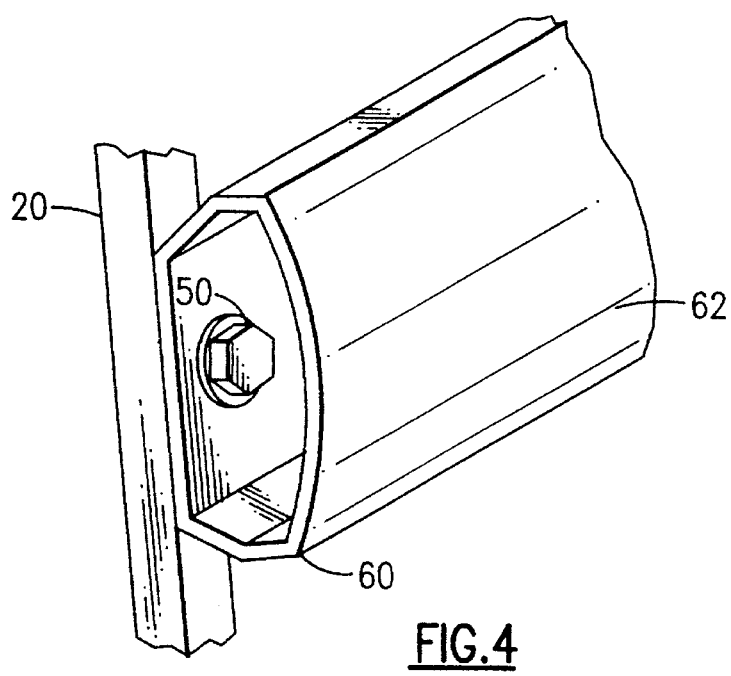
FIG. 4 is a partial perspective view of a second embodiment of this invention.
Figure 5:
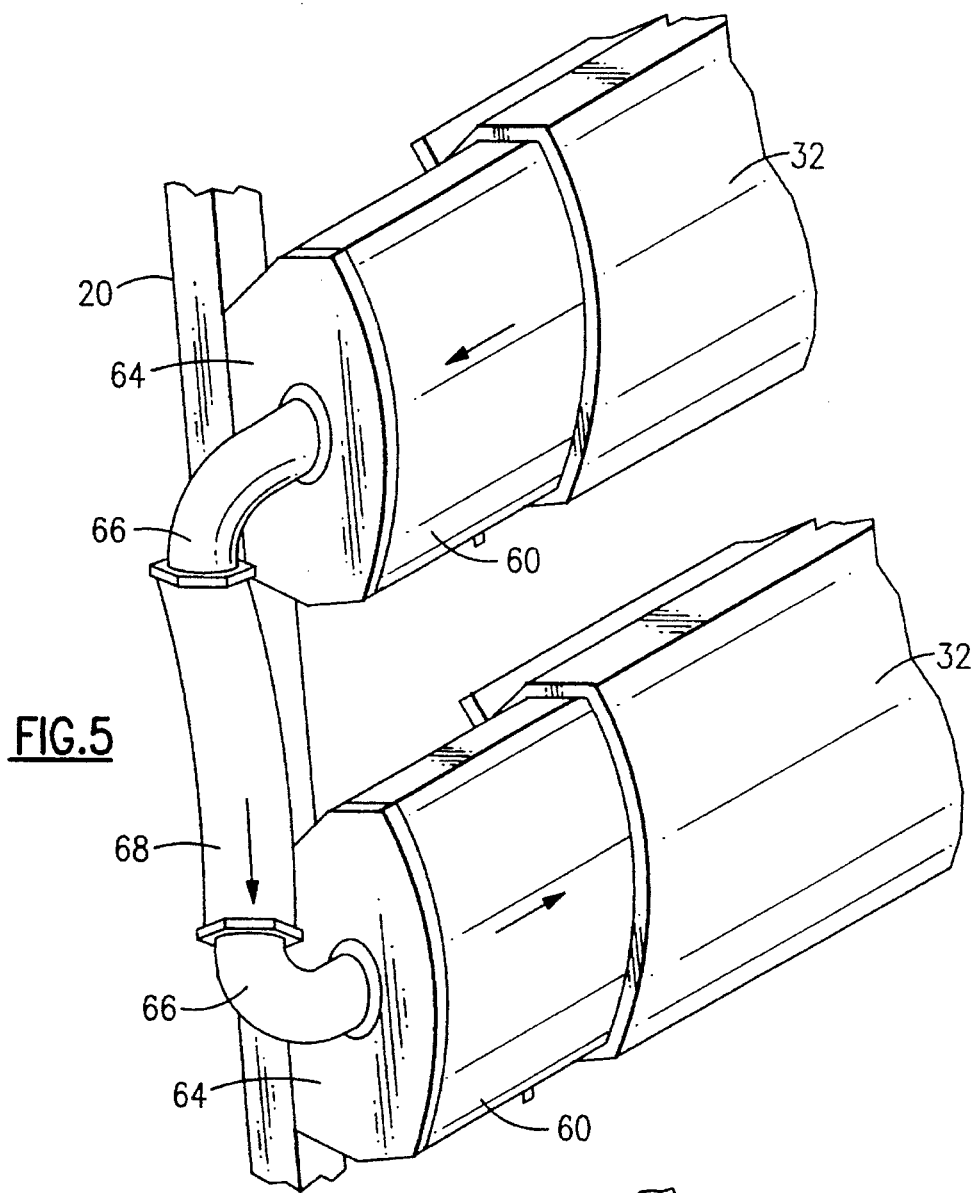
FIG. 5 is another perspective view of the embodiment of FIG. 4 showing an adaptation for water cooling.

An alternative embodiment is shown in FIG. 4. Here, a closed-profile extrusion 60 is employed as the backer board. The extrusion is fastened to the collapsing frame 20 by bolts 50 in a manner similar to the embodiment of FIG. 3. In this case the extrusion has a continuous arcuate front wall 62. The cover 32 can snap fit over the extrusion 60 in the same manner as previously described, and as shown in FIG. 5.

As also shown, the tubular extrusions 60 can be closed off with end caps 64. Each end cap 64 has a port or nipple 66. Tubing or piping 68 joins the nipples 64 on the end caps of successive ones of the extrusions 60. This permits a coolant fluid to flow throughout the collapsing frame to dissipate heat that can build up from movement of the plastic film 12 against the from surfaces of the collapsing boards. The rate of flow of the coolant fluid, which can be water, is preferably controlled to manage the heat in the system and to keep the collapsing system within a predetermined temperature range.

Figure 6:
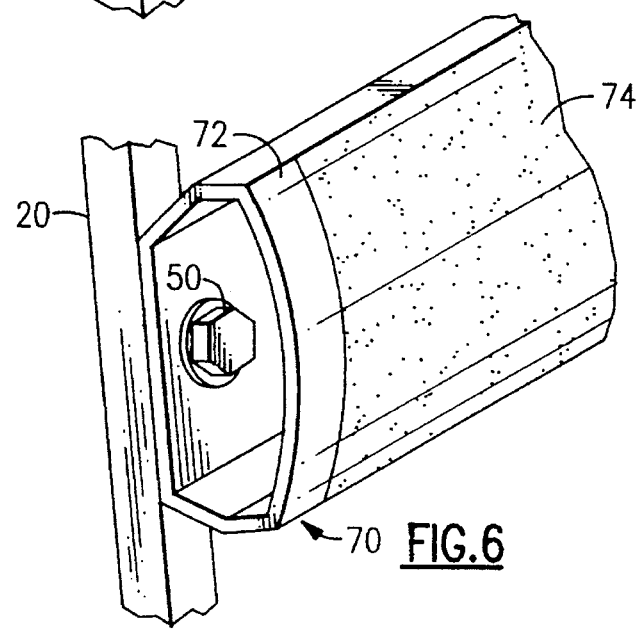
FIG. 6 is a partial perspective view of a third embodiment of this invention.

A further embodiment of this invention is shown in FIG. 6, in which a closed-loop-profile extrusion 70 serves as the collapsing board. In this case, a front surface 72 of the extrusion has a low-friction coating 74, e.g., a ceramic coating, deposited on it. A succession of these extrusions 70 can be installed as shown in FIG. 7, with end caps 64 and piping 68 to connect the fluid ports 66.

A further embodiment is illustrated in FIGS. 8 and 9. Here, an alternative wear plate or cover 132 can be employed, e.g., with the extruded collapsing boards as described above. Elements of this collapsing board cover 132 that correspond to the features of the cover 32 described earlier are identified with similar reference numbers, but raised by 100. The cover 132, as shown in cross-section in FIG. 8, has a front web 134, upper and lower flanges 136, and retaining lips or beads 138. The web 134 is made of two co-extruded layers, including a front layer 140 that is filled with a lubricant, and a back layer 142 that is given a color distinct from the color of the front layer 140. As shown in the enlarged section of FIG. 9, which is lined for the colors gay and red, the front graphite-impregnated layer 140 can be a gray color, and the backing layer 142 can be a bright red.

In use, as the front layer 140 becomes abraded away, the red of the back layer 142 is revealed. This gives a clear, visible indication of the condition of the cover 134, and signals a maintenance crew that it is time to change the cover 134.

The extruded collapsing board members can be aluminum, magnesium, or any other convenient metal or alloy. These can be fabricated in any arbitrary length, as can the covers. The plastic covers 32, 132 can be made of Torlon or of a wide variety of other plastic resin materials.

While this invention has been described in detail with reference to certain preferred embodiments, the invention is not limited to those embodiments. Rather, many modifications and variations can be carried out by those skilled in the art without departing from the scope and spirit of this invention, as defined in the appended claims.

I claim:

1. In combination, an extruded metal collapsing board member and a replaceable wear cover therefor, the metal collapsing board member having a back plate which fastens to a collapsing assembly frame and a front face spaced therefrom to define an internal void; and said wear cover being formed of an extruded plastic synthetic resin with a convex from web dimensioned to match the front face of the extruded metal collapsing board, upper and lower flanges at edges of said web, and inwardly directed members at free edges of the upper and lower flanges which fit into corresponding retaining structure of the extruded collapsing board member to retain the cover removably thereon.

2. The combination of claim 1 wherein said plastic synthetic resin is impregnated with a lubricating agent.

3. The combination of claim 1 wherein said plastic material of said from web is formed of two layers with an outer layer of a first color and impregnated with a lubricating agent, and a backing layer of a second color that is distinct from said first color, so that the backing layer is visually observable when said first layer is worn away from use.

4. The combination of claim 1 wherein said extruded metal collapsing board member has a generally C-shaped profile with said from face having a gap defined between inwardly directed flanges, said flanges supporting the front web of said cover.

5. The combination of claim 1 wherein said extruded metal collapsing board member is a tubular member with a closed loop profile, having a continuous arcuate front face.

6. The combination of claim 5 further comprising end caps closing off ends of said extruded metal collapsing board members, said end caps each including a fluid port, and piping means connecting the fluid ports of respective ones of said end caps to permit coolant fluid to flow through said collapsing board members.

7. A collapsing board employed in the manufacture of polyethylene film wherein a plurality of collapsing boards are arranged parallel across a travel direction of said film to contact the latter and urge an extrusion of the film to a flattened condition; wherein said collapsing board includes an extruded metal member which comprises a back plate which fastens to a collapsing assembly frame, and an arcuate front face spaced therefrom; and a low-friction material applied onto said arcuate front face to contact said polyethylene film travelling therepast.

8. A collapsing board according to claim 7 wherein said low-friction material is in the form of a replaceable wear cover formed of an extruded plastic resin which contains a lubricant filler.

9. A collapsing board according to claim 7 wherein said low-friction material includes a low-friction coating deposited onto said arcuate front face.

10. A collapsing board according to claim 7 wherein said extruded member is tubular, and further comprising end caps closing off ends of said extruded members, said end caps each including a coolant port; and piping members connecting the coolant ports of respective ones of the collapsing boards to permit a coolant fluid to flow through said collapsing boards.

11. A cover for a collapsing board employed in the manufacture of polyethylene film wherein a plurality of collapsing boards are arranged parallel across a travel direction of said film to contact the latter and urge an extrusion of the film to flatten, each of said collapsing boards being an elongated member with a front face across which the film travels, and having supporting structure onto which the cover is removably installed; wherein said cover has a front web portion dimensioned to match the front face of the collapsing board and retaining means disposed respectively at upper and lower edges of said front web portion to engage said supporting structure and hold the cover removably in place; wherein said front web portion is formed of two layers including an outer layer of a first color and impregnated with a lubricating agent and a backing layer of a second color distinct from said first color.

12. The combination of claim 1 wherein said extruded metal collapsing board member includes means for rigidly affixing said collapsing board member to said collapsing assembly frame.

13. The combination of claim 12 wherein said means for affixing includes a threaded fastener and a through-hole in the back plate for accepting said threaded fastener.

14. A guide member for guiding a tube of flexible plastic film created in a tube extrusion process, comprising an elongated extruded metal member having, in cross section, an arcuate front face, a back plate, and upper and lower recesses joining the front face and the back plate; and a wear strip formed of a plastic synthetic resin and having a convex front web dimensioned to match the front face of the extruded metal member, and upper and lower inwardly directed retaining lips which fit into said upper and lower recesses of said extruded metal member to retain the wear strip removably in place thereon.

15. The guide member of claim 14 wherein said front face has a generally C-shaped profile, and the wear strip front web has a corresponding C-shaped profile.

16. The guide member of claim 14 wherein said extruded metal member further includes end caps closing off ends thereof, said end caps each including a fluid port; and further including piping means for permitting a fluid coolant to flow through said guide member.

* * * * *

UNITED STATES PATENT AND TRADEMARK OFFICE
CERTIFICATE OF CORRECTION

PATENT NO. : 5,585,120
DATED : December 17, 1996
INVENTOR(S) : Earl T. Pottorff

It is certified that error appears in the above—identified patent and that said Letters Patent is hereby corrected as shown below:

Col 1, line 50
"match the front thee" should read --match the front face--

Col 4, line 31
"against the from surfaces" should read --against the front surfaces--

Signed and Sealed this

Fourth Day of March, 1997

BRUCE LEHMAN

*Attest:*

*Attesting Officer*   Commissioner of Patents and Trademarks